W. P. & S. G. THOMSON.
RAIL JOINT.
APPLICATION FILED MAR. 22, 1911.
1,005,583.
Patented Oct. 10, 1911.
2 SHEETS—SHEET 1.
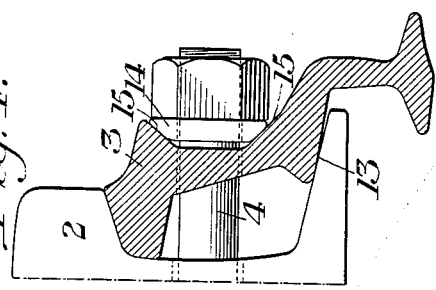
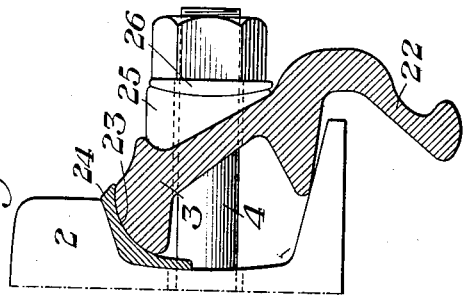
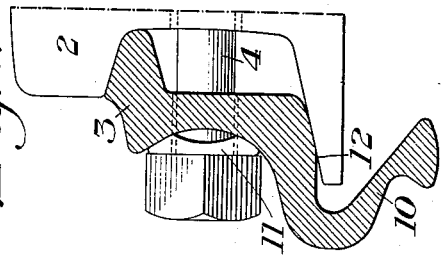
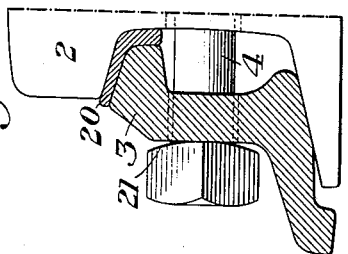
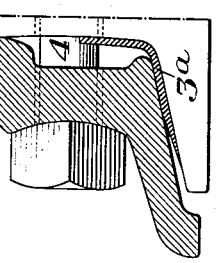
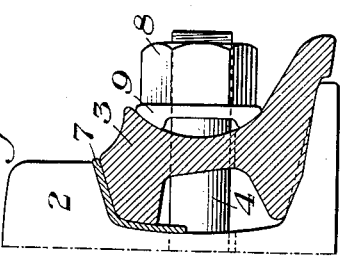
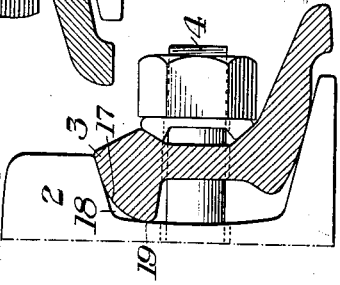
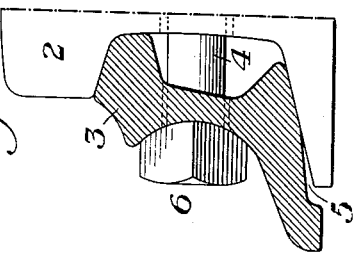
WITNESSES
R. A. Balderson
W. Tamariss
INVENTORS
Wm. P. Thomson
S. G. Thomson
by Bakewell, Byrnes Parmelee
Attys W. P. & S. G. THOMSON.
RAIL JOINT.
APPLICATION FILED MAR. 22, 1911.
1,005,583.
Patented Oct. 10, 1911.
2 SHEETS—SHEET 2.
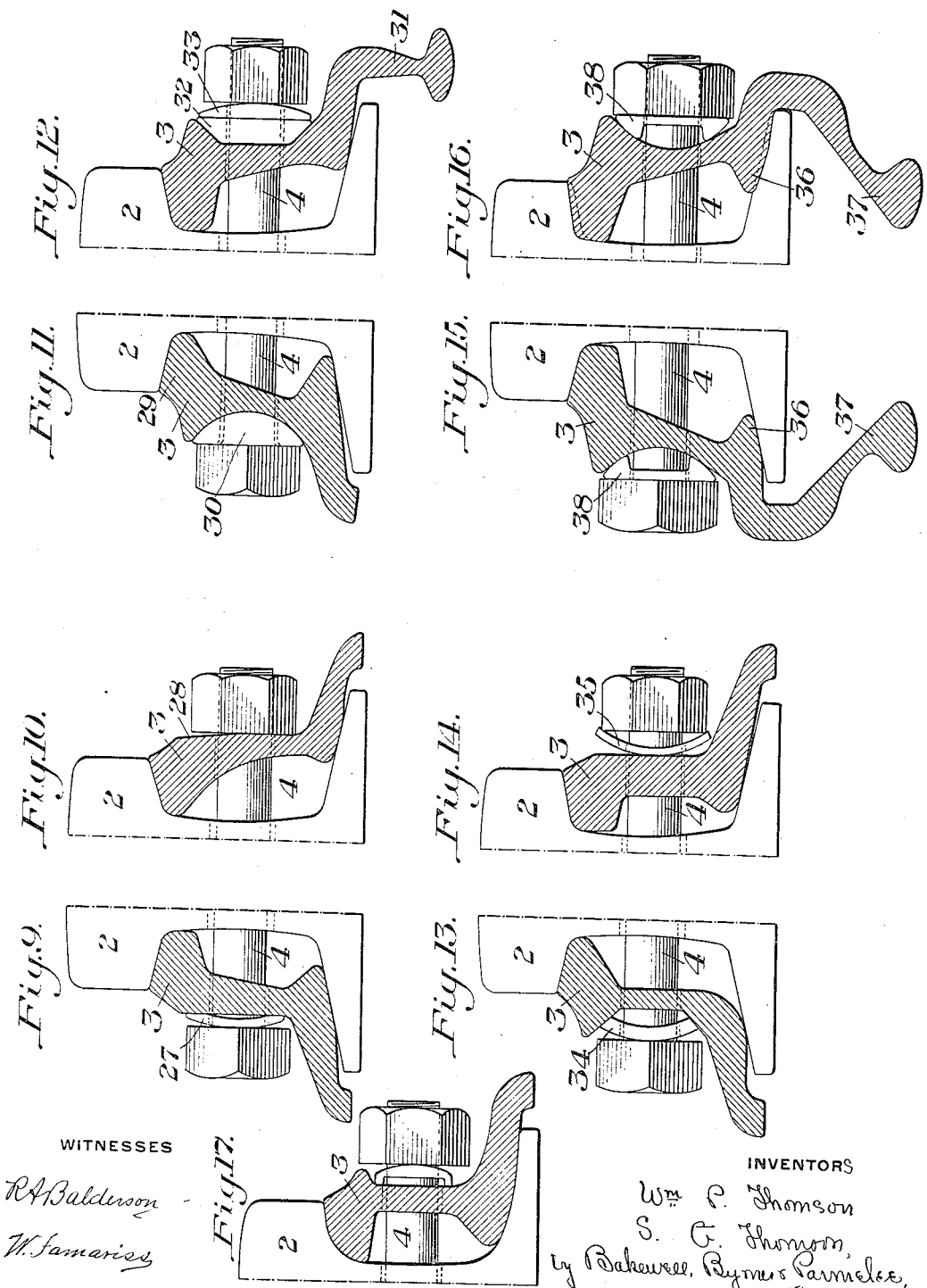

UNITED STATES PATENT OFFICE.

WILLIAM P. THOMSON AND SAMUEL G. THOMSON, OF PHILADELPHIA, PENNSYLVANIA, ASSIGNORS TO THOMSON-THOMSON COMPANY, OF PHILADELPHIA, PENNSYLVANIA, A PARTNERSHIP.

RAIL-JOINT.

1,005,583.

Specification of Letters Patent.   Patented Oct. 10, 1911.

Application filed March 22, 1911.   Serial No. 616,160.

*To all whom it may concern:*

Be it known that we, WILLIAM P. THOMSON and SAMUEL G. THOMSON, both residents of Philadelphia, in the county of Philadelphia and State of Pennsylvania, have invented a new and useful Improvement in Rail-Joints, of which the following is a full, clear, and exact description, reference being had to the accompanying drawings, forming part of this specification, in which—

Figure 1 is a sectional elevation showing one form of our invention. Fig. 2 is a similar view showing the position of the bar of Fig. 1 after an extreme adjustment of the bar. This figure also illustrates the use of a filler between the head of the bar and head of the rail. Figs. 3 to 15, inclusive, are views similar to Figs. 1 and 2, and showing different forms of our invention. Fig. 5ᵃ is a view showing a modification. Fig. 16 is a view similar to Fig. 15, but illustrating the seating of the joint plate after considerable wear has occurred. Fig. 17 is a sectional elevation showing another modification.

Our invention has relation to rail joints, and is designed to provide an efficient joint having a novel manner of seating and adjustment of the joint plates or members, whereby the joint may be readily tightened to take up all wear and looseness and whereby a maximum stiffness and efficiency is obtained.

The efficiency and stiffness of a rail joint depends largely on the tightness of the joint bolts and the accurate fitting of the joint members or bars to the fishing angles of the rails. In rail joints of that class which do not have clamping bolts below the rail base, the tendency of the splice bars under load is to move inwardly at the head portion and to kick out at the foot portion, and to lift off from the rail base at its outer edge. This throws a cross strain on the joint bolts, and this movement is not materially resisted by the tension of the bolts. This is especially true of types of splice bars having a free flange depending below the rail base between the ties. Under the more or less constant vibration of the rails, the heads of the bars now in use work inwardly until they strike the rail web, while the foot portions of the bars kick out to a corresponding extent, and thus destroy the fit of the bars by lifting them away from the rail bases at the outer edges of the latter. This lack of fit, of course, loosens the bolts and greatly reduces the stiffness of the joint. The rotative action of the bars throws a cross strain on the bolts; and the only resistance to prevent this is a wide, flat bearing on the rail base extending inwardly almost to the web, together with the flat bearing of the nut on the flat, outer face of the bar. If the outer face of the bar is concave, or if small nut locks or washers are used under the nuts, or if the foot member of the bar does not extend inwardly almost to the rail web, the bars are free to rotate to an extent to permit the inner sides of the heads to come in contact with the rail web.

Our invention is designed to give the heads of the bars a fulcrum point against the rail webs or against an intervening spacer in such a manner as to prevent any inward movement of the top of the bar, and in such a manner that any outward movement of the foot of the bar must be accompanied by a stretching of the bolts, instead of a canting inwardly and outwardly of the bar around the center line of the bolt holes, such as occurs in the present joints, and which does not require any stretching of the bolts. By our invention, the center of rotation of the bar is transferred to its top, and any outward movement at the bolt holes must be made in a direction tending to lengthen the bolts, since the entire bar sweeps through one angle. The fulcrum point for the splice bar being located at its top, the tendency of the bolt and nut is to slip to a lower position on the face of the bar as the latter is drawn inwardly at the foot. This increases the clamping action against the rail foot as the wear of the bar and rail increases, and thus the tendency to kick out at the bottom becomes less as the wear increases.

A further advantage of our invention, and one which is of equal importance, is that we obtain for the bar an extra width of the head, with increased bearing surface at the rail head to resist wear. This additional metal in the head is provided by filling in the space heretofore required for clearance, and greatly stiffens the bar as well as lengthens its life.

Other advantages of our invention will hereinafter appear, and will be more apparent after the concrete embodiments of our invention shown in the accompanying drawings have been described.

The numeral 2 wherever seen, designates a portion of a track rail, 3 a splice bar, and 4 a joint bolt.

In the form of our invention shown in Fig. 1, the head of the splice bar 3 contacts directly with the rail web, and the inner portion of the foot of the bar has a bearing on the rail base for a width about equal to the bearing of the bar under the rail head. The outer portion of the foot of the bar stands free from the rail base to provide clearance 5 to permit the bar to be drawn up or tightened. The outer gripping face of the bar is of uniformly curved concave form, and the bolt head 6 fits this concavity in such a way as to provide for a continuous bearing as the bar is drawn inwardly at its foot. In other words, the head or nut 6 of the bolt will adjust itself to a proper bearing on this concaved face, notwithstanding the change in the position of the bolt as the bar is drawn inwardly.

Fig. 2 shows substantially the same bar as Fig. 1, drawn inwardly to its extreme limit, the wear at the base being indicated in dotted lines. This wear is divided between the bar and the top of the rail base, the tendency being for the under face of the bar to become flattened, and for the upper surface of the rail base to become concave to fit it, the resultant being a slightly concave fitting surface. In this figure, we have also shown a spacing strip 7 inserted between the head of the bar and the head of the rail in order to space the head of the bar solidly against lateral movement. This strip or filling piece may be used for this purpose, or the head itself can contact directly with the rail web, as shown in Fig. 1. Fig. 2 also represents a bearing washer for the nut 8 of the joint bolt. This washer 9 fits into the outer face of the bar and readily adjusts itself on the curved surface of this outer face as the bar changes its angle, thus maintaining a vertical bearing face for the nut.

Fig. 3 shows our invention applied to a somewhat different form of splice bar having a freely depending flange 10 extending inwardly underneath the rail base. The head or nut of the bolts is provided with a washer 11, generally similar to the washer 9 shown in Fig. 2, the nut or head of the bolt being flat on its inner face. The splice bar contacts solidly under the rail head and against the web at a point as high as possible so as to increase the leverage of the bar against the rail base. The under face of the foot of the bar is convex, as shown at 12, and contacts with the rail foot for only a small portion of its width. This contacting convex face will roll or slide over the rail base as the bolts are tightened, and tends to become flattened along the greater portion of its width when the limit of draw has been reached.

Fig. 4 shows our invention applied to a splice bar having a downwardly and outwardly slanting web, and with only a small contact at 13 with the upper surface of the rail base, this contact being at the inner portion of the under bearing face of the foot member of the bar. A movable washer 14 is used under the nut or bolt head, fitting the bevel outer faces 15 of the bar so as to provide a vertical bearing surface for the bolt head or nut.

Fig. 5 shows our invention applied to the ordinary type of angle bar. This bar as shown, has a solid bearing against the rail web under the head, and is formed with a concave outer gripping face 16 for the bolt head or nut. This bar has a comparatively narrow bearing on the rail base at its inner extremity; and the limit of inward movement or draw will be reached after the wear becomes sufficient to allow the outer end portion of the foot member to come down solidly on the rail base.

Fig. 5ª shows a liner interposed between the foot of a splice bar and the foot of the rail to accomplish substantially the same purpose as is described in connection with Fig. 5 or in any other case where a direct bearing between the base of the splice bar and the base of the rail is shown.

Fig. 6 shows a modified form of splice bar, which has its head formed with a convex rail bearing portion 17, giving a clearance space 18 at the fillet joining the rail web with the head. In this construction the fulcrum point of the bar is brought down to the point 19, where it contacts with the rail web, thus considerably lowering this fulcrum point, increasing the clamping action of the bar against the web, but decreasing the leverage of the bar against the rail base.

Fig. 7 shows our invention applied to an ordinary form of bar with a liner 20 between the head of the bar and the head of the rail. The bar has a vertical outer face, and the inner surface of the bolt head or nut is curved, as shown at 21, in order to allow for the angularity of the splice bar as it is drawn inwardly.

Fig. 8 shows the invention applied to a form of splice bar having a web portion slanting downwardly and outwardly to a greater extent than the bar of Fig. 4, and also having a depending flange 22 extending below and under the rail base. The head of the bar has a convex bearing surface 23, and a liner 24 is interposed between the head and the rail. The concave bearing face of this liner is of such curvature as to provide a continuous bearing for the head of the splice bar as the angularity of the bar changes. In this form, we have shown a washer 25 of triangular form, fitting the outer inclined surface of the splice bar and providing a substantially upright concave seat for another washer 26, which in turn provides a vertical face for the nut or bolt head. The foot portion of the bar bears against the rail base at its inner edge only. As the bar is drawn inwardly, the change in angularity is provided for by the slipping of the coacting curved bearing faces of the two washers 25 and 26.

In the form of our invention shown in Fig. 9, the outer face of the bar is vertical, and a spring washer 27 having a convex outer face is interposed between the bar and the nut or bolt head. In this form the change in the angularity of the bar is provided for by the rolling of the bolt head or nut on the outer convex face of this washer.

Fig. 10 shows a splice bar with a flat vertical outer face bearing against the lower half only of the nut head or bolt. The outer face of the upper portion 28 of the splice bar is at such an angle to the gripping face of the nut as will provide a vertical face for the nut when the bar is drawn up to the limit of wear.

Fig. 11 shows an angle bar with a wide head 29 contacting with the web and head of the rail, and having a concave outer face fitted by a washer 30 having a convex inner face and a vertical outer face for the bolt head or nut. The washer will adjust itself to provide a vertical bearing surface for the bolt head or nut as the angularity of the bar changes.

Fig. 12 shows another form of splice bar having a freely depending flange 31. A washer 32 fits the outer face of the splice bar in such a manner as to cause it to assume the same angularity as the bar. This washer has a flat outer face providing a seat for another washer 33 which has a convex outer gripping face for the nut or bolt head. As the bar is drawn inwardly at the bottom, the outer washer slips on the inner one, and the nut has a rolling bearing on the outer face of the outer washer. The tendency of the outer washer is to work down into contact with the bar, and thus increase the pressure of the bar on the rail base as the bar is drawn inwardly.

Fig. 13 shows the bearing for the nut or bolt head as being provided by a bridge plate 34 fitting the beveled outer surface of the head and foot portions of the bar and having a convex outer bearing surface for the bolt head or nut.

Fig. 14 shows the splice bar as having a vertical outer face, with a bent washer 35 of resilient material having its convex inner face bearing against the splice bar and its concave outer face engaging the corners of the nut or bolt head. This washer acts as a spring nut lock, and at the same time provides for the angular movement of the splice bar.

Fig. 15 shows an angle bar with a wide head and downwardly and outwardly slanting web, with a short inward projection 36 extending over and engaging the rail base, and also having a deep freely depending flange 37. This design provides a deep girder joint extending around the rail base in such a way as to eliminate all buckling with the use of a minimum amount of metal, there being no long member extending inwardly to provide a bearing on the face of the rail adjacent to the rail web.

Fig. 15 shows the bar in the position it occupies when first applied. Fig. 16 illustrates the same bar after it is drawn up after being worn to the limit, the wear being shown in dotted lines under the head and at the top of the rail base. This wear is, of course, divided between the bar and the rail. The change in angularity of the bar, together with the change in the position of the bolts, will be clearly seen by comparison of these two figures. The bolt is shown to be in a lower position after the bearing has become worn, due to the slipping downwardly of the washer 38 (which is substantially the form shown in Figs. 2, 3 and 6) around the curved outer face of the bar.

Fig. 17 shows the splice bar as having curved bearing faces on its head and foot fitting similarly curved bearing faces on the rail. The curvature of these bearing faces is preferably parabolic, in which case the focal distance of the curve on top of the rail base and at the bottom of the rail web is preferably greater than the focal distance at the top of the rail web and under the rail head. Any regular or irregular compounding of curves will suffice, however, to accomplish the same purpose so long as the splice bar is free to rotate around a pivotal point on the head of the splice bar.

It will be understood that the drawings are illustrative only of several different embodiments of our invention, and that the principle involved in our invention can be accomplished in various other ways. Various combinations of the bolt heads, nut, washers, and outer face of the bar, may be employed to permit of the novel method of drawing up the bars to take up wear. While the drawings show the ordinary or special T-rails, it will, of course, be understood that our improvement applies equally to splice bars with a girder and other types of rails. We also desire it to be understood that wherever, in the specification or claims it is stated that the head or foot of the splice bar has a bearing against the rail, that such bearing may be either a direct engagement, or through a suitable liner. This liner or wear strip can be inserted with bars now in use, in order to give the benefit of our improvement, or the bars can be originally constructed with provision made for this strip. The strip can be renewed from time to time, and thus greatly increase the life of the bars. It can be made of any suitable material; and the large increased bearing surface under the rail head thus obtained is specially desirable in insulated joints.

It will be seen that in joints embodying our invention, the contact faces between the bar and the rails are altered as the bars are drawn inwardly at the foot to take up wear. This alteration, however, is so gradual that the wear takes place at the points where the greatest pressure is exerted, and any angularity of the fitted faces tends to wear off into flat surfaces, which at all times provide substantial bearings between the bars and the rails. The bearing of the splice bars on the upper surfaces of the rail bases may be made slightly convex, so that the fit is always tight; and since the wearing action tends to slightly concave the upper surface of the rail foot, the bearing between the bar and the rails at this point may be made of substantially the same area and practically as great as the bearing of the bar under the head of the rails.

Heretofore, almost all of a flat top surface of the rail base has been used as a fitting surface for the splice bar in order to obtain a good fit and to maintain the splice bars in a vertical position. Our invention enables the elimination of that portion of the splice bar which has been extended inwardly along the top of the rail base to provide a bearing at its extreme inward point in order to prevent the sluing of the bar within the fishing angles of the rails. In angular splice bars not having portions extending below the rail base, this metal extending inwardly over the rail base, is, of course, desirable, for its stiffening effect; but in the forms of splice bars having stiffening girders extending below the rail base, this metal at the middle portion of the bar, and which is used only to provide an inner bearing which will keep the bar in a vertical position, is entirely wasted, since it is located almost exactly at the horizontal neutral axis of the bar.

The bar of our invention bears against the rail webs, and keeps the rails in line without throwing any additional pressure on the fishing angles. The side thrust is, therefore, taken care of directly, without any wedge action, and the fishing angles, therefore, have only the vertical loads to carry. With the fishing angles alone to keep the rails in line, as is now the practice, it is apparent that a very slight wearing of these angles will allow considerable lateral displacement of the rail ends. Our improved bars, on the contrary, afford a positive clamping against the rail web at both sides and oppose a direct resistance against any lateral thrusts, whereby the alinement is maintained regardless of the wear of the fishing angles. It is, therefore, to be understood that any arrangement or combination of flat or curved fitting faces between the head or foot of the splice bar and the rail (or its equivalent in the form of an interposed liner) which permits the splice bar to have a rotative angular movement around a pivotal point adjacent to its top while the bar is being tightened on the rail by the clamping bolts, is to be considered as coming within the scope of our invention.

What we claim is:—

1. In a rail joint, a splice bar adapted to contact with the rail foot and to be drawn toward the rail web by the joint bolts at its foot portion only, and means for maintaining the pulling strains in the clamping bolts in lines parallel to their straight longitudinal axes.

2. In a rail joint, a splice bar having an upright bolting member adapted to move through an angle as the bar is drawn toward the rail web to take up wear, and means for maintaining a clamping action of equal force against said bolting member above and below the bolt holes.

3. In a rail joint, a splice bar adapted to have a rotative angular movement around a pivotal point adjacent to its top as the bar is drawn toward the rails by the joint bolts in order to take up wear, said bolts maintaining a clamping action of equal force against said bar above and below the bolt holes.

4. In a rail joint, a bar having a rotative angular movement around a pivotal or fulcrum point adjacent to its top, as it is drawn toward the rail by the joint bolts in order to take up wear, said bar also having a concave outer face, and clamping means engaging a portion of said outer face.

5. In a rail joint, a splice bar adapted to change its angle of repose with reference to the rail as it is drawn toward the rail to take up wear, and clamping means engaging the outer face of said bar and adapted to maintain an equal clamping force above and below the bolt holes.

6. In a rail joint, a splice bar contacting with the rail foot and adapted to move toward the rail a greater distance at its foot portion than at its head portion as it is drawn to take up wear, and means for maintaining the strains in the clamping bolts in straight lines parallel to their length.

7. In a rail joint, a splice bar having a foot portion adapted to be drawn up along the top face of the rail base toward the rail by the action of the joint bolts, and means for preventing the head of the bar from moving toward the rail web, said bolts being adapted to slip downwardly into a direct straight line of pull as the foot portions of the bars are drawn inwardly.

8. In a rail joint, a rail having a base provided with a concave upper face, and a splice bar having a convex contacting face, said bar abutting against the rail web adjacent to its top, and a washer adapted to slip on the outer face of the bar in order to maintain a vertical outer gripping face.

9. In a rail joint, a splice bar having its contact with the top of the rail base adapted to increase and spread outwardly as the bar is drawn toward the rail to take up wear, and a washer adapted to slip on the outer face of the bar in order to maintain a vertical outer gripping face.

10. In a rail joint, a splice bar having a head bearing against the rail web, said bar standing free from the top face of the rail base at its outer edge, and a washer adapted to maintain a vertical outer gripping face as the lower portion of said bar is drawn toward the rail to take up wear.

11. A splice bar for rail joints having a head adapted to bear against the rail web, and a foot portion to fit the top of the rail base, said fitting faces being of substantially less width than the width of the top of the rail base, and means for clamping the bar to the rails with equal force above and below the bolts as the bar is drawn toward the rail at its foot portion.

12. In a rail joint, a splice bar having its head bearing against the rail web and having a part of a substantially convex under face of its foot bearing on the top of the rail base, and a washer adapted to slip on the outer face of said bar in order to maintain a vertical gripping face as the bar is drawn up through an angle.

13. A splice bar for rails, having a head adapted to bear against a rail web, and having a foot portion adapted to slide along the top of the rail base in order to take up wear, and a washer adapted to maintain a vertical outer gripping face as the bar slides along the rail foot.

14. A splice bar for rails having head and foot portions, the head portion adapted to bear against the rail web, and the foot portion to stand free of the rail web and to draw inwardly toward the rail along the top of the rail base, and a washer which will adjust itself against the outer face of the bar so as to relieve the bolt of all cross strains as the angularity of the bar changes.

15. In a rail joint, the combination with a splice bar adapted to be drawn toward the rail web by the joint bolts at its foot portion only, of a washer having a vertical nut-bearing outer face and an inner bearing face capable of moving on its seat as the parts of the joint are drawn up by the bolts.

16. In a rail joint, a splice bar adapted to be drawn toward the rail web by the joint bolts at its foot portion only, and a plate or washer arranged to maintain a vertical outer face, notwithstanding the movement of the part which provides a seat for the opposite face of said plate or washer as it is moved through an angle by the tightening of said bolts.

17. In a rail joint, a splice bar having an outer face which moves through an angle as the bar is tightened to take up wear, and a plate or washer contacting with said outer face and adapted to maintain a vertical gripping face for a bolt head or nut.

18. In a rail joint, a splice bar and a joint bolt adapted to maintain a clamping action of equal force against said bar above and below the bolt as the bar is moved inwardly at the bottom through an angle by the tightening of the bolt.

19. In a rail joint, the combination of a splice bar adapted to be drawn toward the rail web by the joint bolts at its foot portion only, a plate interposed between the under side of the rail head and the top of the splice bar, said plate limiting the movement of the splice bar toward the rail web when the foot of the splice bar is drawn toward said web by the joint bolts, and an adjustable washer adapted to maintain a vertical gripping face for a nut as the bar is drawn up through an angle to take up wear.

20. In a rail joint, a splice bar having a fulcrum bearing at its top against the rail web, and having a sliding bearing at its foot portion against the top of the base flange of the rail, whereby said bar may be drawn toward the rail web by a joint bolt at its foot portion only, and means whereby the position of the bolt may be automatically lowered as the angularity of the splice bar changes.

In testimony whereof, we have hereunto set our hands.

WILLIAM P. THOMSON.
SAMUEL G. THOMSON.

Witnesses:
McLeod Thomson,
Morris L. Kolb.